United States Patent Office 2,792,335
Patented May 14, 1957

2,792,335

FORMALDEHYDE TREATING OF CATALYTIC FURNACE OIL

Robert W. Foreman and Ralph A. Gardner, Cleveland, and Samuel M. Darling, Lyndhurst, Ohio, assignors to The Standard Oil Company, Cleveland, Ohio, a corporation of Ohio No Drawing. Application January 19, 1953, Serial No. 332,098

2 Claims. (Cl. 196—39)

This invention relates to a method for improving the storage stability of so-called catalytically cracked oils of the distillate furnace oil type.

In the production of gasoline, it is common to employ catalytic cracking in which hydrocarbon oils are contacted, generally in the vapor phase, with catalysts such as synthetic silica-alumina, silica-alumina-zirconia, silica-alumina-magnesia, etc., and acid treated clays generally of the bentonite or montmorillonite type. The heavier stocks from such a process, have especial value as furnace oils, which are herein termed "catalytically cracked furnace oils." These boil in the range of about 380° F. to 640° F. although higher end points up to 720° F. are sometimes used. They are more unsaturated in character than straight run or virgin stocks.

In storage these catalytically cracked furnace distillates tend to become darker in color and in many instances a gum or sludge separates after the oil has stood for several days or weeks. The development of sludge is, of course, a serious problem since it may result in an accumulation of insoluble material which tends to clog burner screens and tips and results in imperfect operation of the furnace.

The usual methods for stabilizing cracked hydrocarbon light distillates such as gasoline have not been found applicable to the catalytically cracked furnace oils. Thus the gum antioxidants widely used in thermal and catalytically cracked gasoline have little or no benefit in catalytically cracked furnace distillates. This lack of similarity in response to inhibitors suggests that the reactions leading to gum formation in gasoline and to sludge formation in a catalytically cracked furnace oil are different and that no analogies can be drawn. The lack of similarity is not surprising since gasoline from a catalytic cracker is produced from the hydrocarbons in the charge most susceptible to cracking while the furnace oil (which is in the same boiling range as the feed stock) includes the hydrocarbons least susceptible to cracking. On this basis the two products would be expected to be dissimilar as in the case.

Accordingly, it is the primary object of this invention to provide a process for stabilizing catalytically cracked furnace oils against formation of sludge and gum during the storage of the oil.

According to this invention it has been found that the above object and others may be achieved by contacting a catalytically cracked furnace oil with an aqueous solution of hydrochloric acid and formaldehyde, and thereafter separating the oil and the formaldehyde solution.

In U. S. Patent No. 2,560,632 there is described a process of stabilizing catalytically cracked furnace distillates which comprises dissolving formaldehyde therein. In the patented process the formaldehyde is allowed to remain in the oil. The process of this invention is distinguishable from the patented process by virtue of the facts that the formaldehyde is separated from the oil and that the solution of formaldehyde is acidified. As will be shown later the acidity of the aqueous formaldehyde solution results in the obtainment of markedly improved results over the use of an unacidified aqueous solution of formaldehyde. Another advantage of the present process is that the formaldehyde solution remains effective through a plurality of recycles.

The process also has the advantage that over 99% of the oil treated is recovered. This is to be contrasted with the much lower recovery by other extraction processes.

The process of this invention may be effected by simply mixing together the oil and aqueous acidic formaldehyde solution for a short period of time, separating the oil and formaldehyde solution, and thereafter washing the oil, if desired, until the formaldehyde odor of the oil is negligible.

The concentration of the aqueous acidic formaldehyde solution employed in this invention is not critical. Lower concentrations require longer treating times or perhaps repeated treatment of the oil. Concentrations of less than 1 to 5% probably would not be economical to use. The amount of the hydrochloric acid should be sufficient to provide a normality of at least about 0.01.

The relative proportion of formaldehyde solution to the oil to be treated may be varied over a wide range, and is not critical as long as the amount is sufficient to obtain a separate extract phase after the treatment. Small amounts may require longer treating times or perhaps repeated treatment depending on the amount of stability required.

The duration of contact between the oil and aqueous acidic formaldehyde solution should be sufficient for thorough contact and mixing and is as much a function of the contacting as it is of time. There is no critical lower or upper limit to the duration of contact and accordingly the time of contact may be as long as desired. Contact periods from a few minutes up to three hours have been used although a prolonged contact period does not possess noticeable advantages over shorter contact periods.

A further embodiment of this invention involves the inclusion of methanol in the aqueous acidic formaldehyde solution. While the employment of an aqueous solution of acid and formaldehyde is productive of excellent results, the addition to the aqueous acidic formaldehyde solution of methanol is productive of even better results. Any amount of methanol gives some improvement. The amount should not be so great than an appreciable amount will dissolve in the oil. Generally amounts of methanol more than twice the amount of the formaldehyde will not be economical.

In order to provide a better understanding of this invention and the advantages thereof the following examples are given. Parts are by volume in the examples.

EXAMPLE 1

The oil treated in this example is a No. 2 furnace oil obtained fresh from activated clay filters. Characteristics of this oil are as follows:

Table I

| | |
|---|---|
| API Gravity, 60° F. | 35.3 |
| Distillation: | |
| IBP | 354° F. |
| 5 cc. | 395° F. |
| 10 cc. | 422° F. |
| 20 cc. | 464° F. |
| 30 cc. | 488° F. |
| 40 cc. | 506° F. |
| 50 cc. | 521° F. |
| 60 cc. | 534° F. |
| 70 cc. | 549° F. |
| 80 cc. | 568° F. |

| | |
|---|---|
| 90 cc. | 599° F. |
| 95 cc. | 631° F. |
| EP | 649° F. |
| Distillate, volume percent | 98 |
| Bottoms, volume percent | 1 |
| Loss, volume percent | 1 |
| Total sulfur, wt. percent | 0.36 |
| Total nitrogen, wt. percent | 0.008 |
| Bromine No. | 11.6 |

Eight hundred (800) parts of the above-described oil is contacted with 180 parts of an aqueous acidic formaldehyde solution containing 30% by weight of formaldehyde and sufficient hydrochloric acid to achieve a normality of 0.1. The contacting is effected by shaking together the oil and formaldehyde solution to effect thorough mixing. After contacting, the oil and aqueous phases are allowed to stratify and are separated by decantation. The oil is then washed with water several times until the formaldehyde odor of the oil is negligible.

In order to demonstrate the improvement in the stability of the oil, samples of oil both treated and untreated are stored in glass containers at ambient temperatures in the dark and from time to time the containers are flushed with air. In additional corresponding tests, polished iron-copper-lead bearing metal test pieces are included in the samples. At the end of 3 months the oils are filtered and the insoluble residues are weighed. It is found that the untreated oil after storage contains 3.9 mgms./100 ml. of insoluble residue whereas the treated oil contains only 2.3 mgms./100 ml. of insoluble residue. In the test wherein metal was included in the samples the untreated sample is found to contain 8.9 mgms./100 ml. of insoluble residue as compared to 0.8 mgms./100 ml. in the treated sample.

Further tests on the treated oil of this example and on other oils treated by the process of this invention have established the fact that there exists a valid correlation between turbidity and the amount of insoluble gums present in the test samples. For this reason, in some of the following examples, measurements of turbidity are used instead of measurements of insoluble residue as representative of the stability of the treated oils.

EXAMPLE 2

The oil treated in this example is a No. 2 furnace oil prepared by blending 12 volume percent of heavy naphtha with a catalytic gas oil that has been taken directly from the distillation tower and filtered through paper. The characteristics of this oil are as follows:

*Table II*

| | |
|---|---|
| API Gravity, 60° F. | 34.1 |
| Distillation: | |
| IBP | 382° F. |
| 5 cc. | 439° F. |
| 10 cc. | 464° F. |
| 20 cc. | 496° F. |
| 30 cc. | 517° F. |
| 40 cc. | 532° F. |
| 50 cc. | 542° F. |
| 60 cc. | 553° F. |
| 70 cc. | 564° F. |
| 80 cc. | 581° F. |
| 90 cc. | 604° F. |
| 95 cc. | 630° F. |
| EP | 642° F. |
| Distillate, volume percent | 98 |
| Bottoms, volume percent | 1 |
| Loss, volume percent | 1 |
| Total sulfur, wt. percent | 0.28 |
| Total nitrogen, wt. percent | 0.008 |
| Bromine No. | 8.5 |

Eight hundred (800) parts of the above-described oil is treated with an aqueous acidic formaldehyde solution according to the exact procedure of Example 1 with the exception that the acidity of the formaldehyde solution is 1.0 normal.

Samples of both treated and untreated oils are placed in storage in glass containers as in Example 1 and allowed to remain for 1 month. At the end of this time the untreated oil has a turbidity measurement of 7.7 (O. D. units × 100) as compared to a turbidity of 3.9 for the treated sample. In the tests wherein metal is present, the turbidity measurement of the untreated oil is 12.0 and that of the treated oil is 4.8.

EXAMPLE 3

The oil treated in this example is the same as the oil treated in Example 2. Several runs are made in which 400 parts of the oil is shaken with 90 parts of an aqueous acidic formaldehyde solution for a period of 3 minutes, after which the oil is washed with water to remove formaldehyde odor. Corresponding runs are also made in which the oil is contacted with a solution of acid without formaldehyde and also runs in which the oil is contacted with a non-acidified solution of formaldehyde. The data for all of these runs is presented in the following table together with accelerated 24 hour test results showing the turbidity of samples from the various runs:

*Table III*

| Sample No. | Parts of oil | Parts of Aqueous Solution | Normality (HCl) | Concentration of HCHO, percent | Accelerated 24 Hour Test [2] Turbidity (O. D. Units × 100) |
|---|---|---|---|---|---|
| A | 400 | 90 | 1.0 | None | 30 |
| B | 400 | 90 | 0.1 | None | 20 |
| C | 400 | 90 | 0.1 | 37 | 6.5 |
| D | 400 | 90 | 0.1 | 20 | 3.5 |
| E | 400 | 90 | 0.1 | 37 | 4.5 |
| F [1] | 400 | 45 | 0.1 | 37 | 4.2 |
| G [1] | 400 | 90 | 0.1 | 37 | 3.0 |
| H | 400 | 90 | None | 37 | 8.0 |
| I | (3) | (3) | (3) | (3) | 18.0 |

[1] In Sample No. F, the acidic formaldehyde solution had previously been used in treating four other samples and in Sample No. G, the acidic formaldehyde solution had previously been used in treating nine other samples.
[2] The oil was exposed for 24 hours to a uniform intense ultra-violet light. This test was found to correlate with the storage stability test.
[3] Untreated.

The data shown in Table III establishes that the treatment of the oil with a solution of acid alone is actually harmful. It further establishes that the treatment with an unacidified formaldehyde solution is beneficial but not nearly as beneficial as the treatment with a hydrochloric acid acidified formaldehyde solution. There is thus furnished evidence of a synergistic effect between the hydrochloric acid and formaldehyde. From the results obtained in Samples F and G it is also evident that the formaldehyde remains effective through a number of recycles.

EXAMPLE 4

In this example 100 parts of a No. 2 furnace oil is shaken for 1 hour with 20 parts of a 30% formaldehyde solution 0.1 normal in hydrochloric acid and additionally containing 20 parts of methyl alcohol. After shaking, the oil and water layers are allowed to stratify and are then separated by decantation. In contrast to the previous examples the effect of the treatment upon the oil is observed by evaporating the aqueous layer to an insoluble residue and the amount of residue in mgms./100 ml. is measured. In this manner it is determined that the aqueous formaldehyde solution, after being used for treating the oil, contains 17.1 mgms./100 ml. of insoluble residue which has been extracted from the oil. In order to determine the effect of the added methyl alcohol, the experiment is repeated omitting the methyl alcohol from the aqueous formaldehyde solution. The amount of insoluble residue is found to be 13.5 mgms./100 ml.

The procedure of this example is again repeated employing an aqueous 0.1 normal solution of hydrochloric acid, omitting both the formaldehyde and methyl alcohol. The amount of insoluble residue, determined in the same manner as previously, is found to be 1.7 mgms./100 ml.

EXAMPLE 5

Four hundred (400) parts of a catalytically cracked furnace oil are shaken for a few minutes with 90 parts of a 20% aqueous solution of formaldehyde containing sufficient sulfuric acid to provide a normality of 0.1. After separating the oil and aqueous phases, the turbidity of the oil is 9.2 (O. D. units$\times$100) after 24 hours' storage. An untreated sample of the same oil has a turbidity of 23.5 (O. D. units$\times$100). This example shows that the results obtained with hydrochloric acid (see Example 3) are noticeably superior.

While the theory of this invention has not yet been adequately explained, it is believed that the aqueous acidic formaldehyde solution selectively extracts sludge and sludge-forming components from the oil. However, should this theory prove to be incorrect, the validity of this invention should not be affected thereby.

We claim:

1. A method for improving the stability of a catalytically cracked furnace oil which comprises contacting 90 parts of said furnace oil with at least 10 parts of an aqueous formaldehyde solution comprising at least 5% formaldehyde and sufficient hydrochloric acid to provide a normality in the range of 0.01 to 1.0 in said aqueous solution.

2. A method for improving the stability of a catalytically cracked furnace oil which comprises contacting 400 parts of said furnace oil with 90 parts of an aqueous formaldehyde solution comprising 20% formaldehyde and sufficient hydrochloric acid to provide a normality of 0.1 in said aqueous solution.

References Cited in the file of this patent

UNITED STATES PATENTS

| | | |
|---|---|---|
| 1,974,311 | Levine | Sept. 18, 1934 |
| 2,018,715 | Fulton | Oct. 29, 1935 |
| 2,098,059 | Morrell | Nov. 2, 1937 |
| 2,567,173 | Arundale et al. | Sept. 11, 1951 |

OTHER REFERENCES

Ormandy et al.: J. I. P. T., vol. 10, pages 99–100 (1924), (Copy in Patent Office Library).